United States Patent
Li et al.

(10) Patent No.: US 11,263,728 B2
(45) Date of Patent: Mar. 1, 2022

(54) PRIORI CONSTRAINT AND OUTLIER SUPPRESSION BASED IMAGE DEBLURRING METHOD

(71) Applicant: Peking University Shenzhen Graduate School, Shenzhen (CN)

(72) Inventors: Ge Li, Shenzhen (CN); Yiwei Zhang, Shenzhen (CN)

(73) Assignee: Peking University Shenzhen Graduate School

(*) Notice: Subject to any disclaimer, the term of this patent is extended or adjusted under 35 U.S.C. 154(b) by 394 days.

(21) Appl. No.: 16/336,855

(22) PCT Filed: Nov. 21, 2017

(86) PCT No.: PCT/CN2017/111996
§ 371 (c)(1),
(2) Date: Mar. 26, 2019

(87) PCT Pub. No.: WO2018/227882
PCT Pub. Date: Dec. 20, 2018

(65) Prior Publication Data
US 2021/0287345 A1    Sep. 16, 2021

(30) Foreign Application Priority Data
Jun. 15, 2017    (CN) .......................... 201710452806.8

(51) Int. Cl.
*G06T 5/00*    (2006.01)
*G06T 5/40*    (2006.01)

(52) U.S. Cl.
CPC .............. *G06T 5/003* (2013.01); *G06T 5/40* (2013.01); *G06T 2207/20048* (2013.01)

(58) Field of Classification Search
CPC .. G06T 5/003; G06T 5/40; G06T 2207/20048
See application file for complete search history.

(56) References Cited

U.S. PATENT DOCUMENTS

| | | | |
|---|---|---|---|
| 2008/0025627 A1 | 1/2008 | Freeman et al. | |
| 2011/0090352 A1* | 4/2011 | Wang | H04N 5/23248 348/208.6 |

(Continued)

FOREIGN PATENT DOCUMENTS

CN    106709877 A    5/2017

OTHER PUBLICATIONS

Pan et al. ("Robust Kernel Estimation with Outliers Handling for Image Deblurring," IEEE Conference on Computer Vision and Pattern Recognition, Date of Conference: Jun. 27-30, 2016) (Year: 2016).*

(Continued)

*Primary Examiner* — Yubin Hung
(74) *Attorney, Agent, or Firm* — The Belles Group, P.C.

(57) ABSTRACT

Provided is an a priori constraint and outlier suppression based image deblurring method. A convolution model is used for fitting a blurring process of a clear image and then the blurred image I is restored, so that the purpose of image deblurring is achieved. The method comprises an evaluation process of the significant structure of a blurred image, a process of blurring kernel estimation and outlier suppression, and a process of restoring the blurred image by non-blind deconvolution. A structure in the blurred image is obtained by use of L0 norm constraint and heavy-tailed a priori information. The L0 norm constraint is used to evaluate the blurring kernel. The evaluated blurring kernel is subjected to outlier suppression. The final restored image is obtained by using a non-blind deconvolution algorithm. The present invention can prominently improve the restoration level of the blurred image.

5 Claims, 5 Drawing Sheets

(56) References Cited

U.S. PATENT DOCUMENTS

| | | | |
|---|---|---|---|
| 2014/0140626 A1* | 5/2014 | Cho | G06T 7/13 |
| | | | 382/199 |
| 2014/0140633 A1* | 5/2014 | Wang | G06T 5/003 |
| | | | 382/255 |
| 2016/0048952 A1* | 2/2016 | Tezaur | G06T 5/004 |
| | | | 382/255 |
| 2016/0171667 A1* | 6/2016 | Tezaur | G06T 5/003 |
| | | | 382/275 |

OTHER PUBLICATIONS

Cho et al. ("Handling outliers in non-blind image deconvolution," International Conference on Computer Vision, Date of Conference: Nov. 6-13, 2011) (Year: 2011).*

Huang et al. ("Fast Image Restoration Methods for Impulse and Gaussian Noises Removal," IEEE Signal Processing Letters, vol. 16, Issue: 6, Jun. 2009) (Year: 2009).*

Wang et al. ("Recent Progress in Image Deblurring," arXiv: 1409.6838 [cs.CV], Version 1; Sep. 24, 2014) (Year: 2014).*

Gong et al. ("Blind Image Deconvolution by Automatic Gradient Activation," IEEE Conference on Computer Vision and Pattern Recognition, Date of Conference: Jun. 27-30, 2016) (Year: 2016).*

Pan et al. ("Kernel Estimation from Salient Structure for Robust Motion Deblurring," arXiv:1212.1073 [cs.CV], Version 2; May 24, 2014) (Year: 2014).*

CN Written Opinion from PCT/CN2017/111996 dated Feb. 8, 2018, pp. 1-4.

* cited by examiner (a)

(b)

(c) $E[r(x)] = 0.5341$ (d)

(a) (b) (c)

PRIORI CONSTRAINT AND OUTLIER SUPPRESSION BASED IMAGE DEBLURRING METHOD

CROSS-REFERENCE TO RELATED PATENT APPLICATIONS

The present application is a U.S. national stage application under 35 U.S.C. § 371 of PCT Application No. PCT/CN2017/111996, filed Nov. 21, 2017, which claims priority to Chinese Patent Application No. 201710452806.8, filed Jun. 15, 2017. The disclosures of the aforementioned priority applications are incorporated herein by reference in their entireties.

TECHNICAL FIELD

The present invention relates to a digital image processing technology, and more particularly relates to a priori constraint and outlier suppression based image deblurring method.

BACKGROUND ART

A deblurring technology is a theme widely studied in an image and video processing field. In a certain sense, blur caused by camera shake seriously affects imaging quality and visual perception of an image. As an extremely important branch of an image preprocessing field, improvement of the deblurring technology directly affects performance of other computer vision algorithms, such as foreground segmentation, object detection and behavioral analysis. Meanwhile, the improvement also affects encoding performance of the image. Therefore, the development of a high-performance deblurring algorithm has an important role.

In general, a convolution model can be used for explaining blurring causes, and a camera shape process can be mapped to a blurring kernel trajectory PSP (Point Spread Function). A problem of restoring a clear image when the blurring kernel is unknown belongs to an ill-posed problem.

Therefore, in a usual sense, the blurring kernel should be usually estimated, and then, convolution operation is conducted with the evaluated blurring kernel to obtain a restored image. Currently, common algorithms include an MAP-based EM algorithm. In many cases, an original $MAP_{x,k}$ (wherein x indicates the clear image, k indicates the blurring kernel) algorithm would take the blurred image as no-blur explanation, which makes failure of successive iterative processes of the evaluated image and the blurring kernel; and the later $MAP_k$ (k indicates the blurring kernel) algorithm is an improvement of $MAP_{x,k}$, which solves the problem of the no-blur explanation. This algorithm firstly estimates the blurring kernel, and then, the image is restored with non-blind deconvolution. However, the algorithms have problems that a priori constraint is insufficient or inappropriate, and meanwhile, the evaluated blurring kernel has a problem of outlier, which is also not solved well. This subtle difference may cause the failure of the deblurring process.

To sum up, the existing deblurring algorithms have disadvantages including that: (I) a priori assumption is incorrect; (II) a priori constraint is inappropriate; and (III) the outlier existing in the blurring kernel is not suppressed. This is because the camera shake process is continuous, which decides the continuity of the blurring kernel trajectory. Therefore, the outlier existing in the blurring kernel is bound to cause the failure of a deconvolution process.

SUMMARY OF THE INVENTION

To overcome the disadvantages of the prior art, the present invention proposes a priori constraint and outlier suppression based image deblurring method, which solves the problems of the existing algorithms: a priori assumption is incorrect; a priori constraint is inappropriate; and the blurring kernel has outliers. By solving the problems, the present invention can prominently improve the restoration level of the blurred image.

The principle of the present invention is: a priori constraint and outlier suppression based image deblurring method is proposed to solve the problems of the existing algorithms: a priori assumption is incorrect; a priori constraint is inappropriate; and the blurring kernel has outliers. Specifically, based on a MAPk algorithm thought, the a priori constraint and the outlier suppression, image deblurring is realized. Firstly, a significant structure in the blurred image is obtained by use of L0 norm constraint and heavy-tailed a priori information; secondly, based on the significant structure, the L0 norm constraint is used to evaluate the blurring kernel; then, the evaluated blurring kernel is subjected to outlier suppression; and finally, the final restored image is obtained by using a non-blind deconvolution algorithm. The method of the present invention can effectively improve the restoration of the blurred image by solving the problems of the existing algorithms: a priori assumption is incorrect; a priori constraint is inappropriate; and the blurring kernel has outliers.

The present invention provides the technical solutions:

A priori constraint and outlier suppression based image deblurring method is provided. A convolution model is used for fitting a blurring process of a clear image, including evaluation of a significant structure of a blurred image, blurring kernel estimation and outlier suppression, and a restoration process of a non-blind deconvolution blurred image;

1) An evaluation process of the significant structure of the blurred image specifically includes the following steps:

1.1) fitting a blurring process of a clear image by using the convolution model in Formula 1:

$$L = I \otimes k + \eta \quad \text{(Formula 1)}$$

wherein L indicates the blurred image, k indicates the blurring kernel, and i indicates the noise (the distribution thereof is assumed to be Gaussian noise);

a priori constraint with a heavy-tailed effect is taken as distribution of a significant structure gradient of the blurred image, as shown in Formula 2:

$$\min_s (\|S \otimes k - L\|^2 + \lambda_1 \|\nabla S\|^{0.5}) \quad \text{(Formula 2)}$$

wherein S indicates the significant structure of the blurred image (not image to be restored), and is used for evaluating the blurred kernel k in auxiliary manner; the first item of the Formula 2 can be taken as a loss function (which would cause the value increase of the Formula 2, but the present invention evaluates to make an optimized equation reach the minimum value S; therefore, an optimization process is not affected); and the second item of the Formula 2 simulates the h heavy-tailed effect with Hyper-Laplacian;

1.2) evaluating the significant structure of the blurred image:

introducing L0 norm to constrain a texture of the significant structure S of the blurred image, and meanwhile, limiting noise of a smooth region in S with L2 norm. The updated formula is shown in Formula 3:

$$\min_{s}(\|S \otimes k - L\|^2 + \lambda_1 \|\nabla S\|^{0.5} + \lambda_2 \|\nabla S \circ M\|_0 + \lambda_3 \|\nabla S \circ (1-M)\|_2^2) \quad \text{(Formula 3)}$$

wherein M is a binary mask indicating texture region in the significant structure S and (1−M) a binary mask indicating smooth region in S; and the latter two items (i.e., the third item and the last item) of the Formula 3 are used for texture constraint, wherein the third item constrains the details of a large size, and the last item constrains the smoothness; M is defined with Formula 4 and Formula 5:

$$r(x) = \frac{\left\|\sum_{y \in N_h(x)} \nabla S(y)\right\|}{\sum_{y \in N_h(x)} \|\nabla S(y)\| + 0.5} \quad \text{(Formula 4)}$$

$$M = H(r - \tau_r) \quad \text{(Formula 5)}$$

In the Formula 4, x indicates a location of a pixel point, y represents pixel points within a window $N_h(x)$ of a given size that is centered at pixel point x, and r(x) indicates a degree that the pixel point at the location x belongs to the texture part. The texture in S can be preliminarily divided with the Formula 4, the value of r(x) is between 0 and 1, and r(x) is in proportion to the possibility that x belongs to the texture part. Meanwhile, the Formula 4 also limits the appearance of a mutational texture (when the size of the blurring kernel is greater than that of the blurred image detail, the image restoration is failed, therefore, the mutational texture should be limited). M in the Formula 5 is obtained by Heaviside step function, wherein $\tau_r$ indicates a threshold of the degree r(x) that the pixel point belongs to the texture part, which is used for distinguishing a texture region and the smooth region in the significant structure S. In the present invention, we obtain $\tau_r$ with a histogram equalization method;

1.3) solving the significant structure of the blurred image, specifically as follows:

Introducing two substitution variables u and w to selectively substitute ∇S to solve the Formula 3, and updating S with an iterative method. A variant of the Formula 3 is as follows:

$$\min_{S,u,w}(\|S \otimes k - L\|^2 + \lambda_1 \|w\|^{0.5} + \lambda_2 \|u \circ M\|_0 + \lambda_3 \|u \circ (1-M)\|_2^2 + \beta \|u - \nabla S\|_2^2 + \gamma \|w - \nabla S\|_2^2) \quad \text{(Formula 6)}$$

We obtain the solution of each iteration S, u and w with alternately updated method; Solution of the variable u:

$$\min_{u}(\lambda_2 \|u \circ M\|_0 + \lambda_3 \|u \circ (1-M)\|_2^2 + \beta \|u - \nabla S\|_2^2) \quad \text{(Formula 7)}$$

$$u = \begin{cases} \frac{\beta}{\lambda_3 + \beta} \nabla S, & M = 0 \\ \nabla S, & M \neq 0, \nabla S^2 \geq \frac{\lambda_2}{\beta} \\ 0, & \text{otherwise} \end{cases} \quad \text{(Formula 8)}$$

Solution of the variable w:

$$\min_{w}(\lambda_1 \|w\|^{0.5} + \gamma \|w - \nabla S\|_2^2) \quad \text{(Formula 9)}$$

We solve the Formula 9 with relatively total variation (RTV);

The solution of a significant structure variable S of the blurred image is as follows:

$$\min_{s}(\|S \otimes k - L\|^2 + \lambda_1 \|w\|^{0.5} + \beta \|u - \nabla S\|_2^2 + \gamma \|w - \nabla S\|_2^2) \quad \text{(Formula 10)}$$

Based on Parsevals theorem, S is obtained by Fourier transform of Formula 10:

$$S = \mathcal{F}^{-1}\left(\frac{\mathcal{F}(L) \circ \mathcal{F}(k) + \beta \mathcal{F}(u) \circ \mathcal{F}(\nabla) + \gamma \mathcal{F}(w) \circ \mathcal{F}(\nabla)}{\mathcal{F}(k) \circ \mathcal{F}(k) + \beta \mathcal{F}(\nabla) \circ \mathcal{F}(\nabla) + \gamma \mathcal{F}(\nabla) \circ \mathcal{F}(\nabla)}\right) \quad \text{(Formula 11)}$$

Wherein, F indicates the Fourier transform, and $F^{-1}$ indicates Fourier inversion.

2) A process of blurring kernel evaluation and outlier suppression specifically includes the following steps:

In the present invention, the blurring kernel is estimated with gradient information and the significant structure, and the blurring kernel trajectory is obtained through iterative update of Formula 14 and Formula 15, as shown in FIG. 6, diagram on the right of FIG. 8 and FIG. 9(c).

Specifically, the blurring kernel is estimated with the significant structure S of the evaluated blurring image in the present invention. We suppress the outlier in the blurring kernel with L0 norm, and the optimization process is as follows:

$$\min_{k}(\|\nabla S \otimes k - \nabla L\|_2^2 + \psi_1 \|k\|_2^2 + \psi_2 \|\nabla k\|_0) \quad \text{(Formula 12)}$$

s.t. $k \geq 0$, $\|k\|_1 = 1$

Similarly, we introduce a substitution variable v for iterative update, and the variant of the Formula 12 is as follows:

$$\min_{v,k}(\|\nabla S \otimes k - \nabla L\|_2^2 + \psi_1 \|k\|_2^2 + \psi_2 \|v\|_0 + \varphi \|v - \nabla k\|_2^2) \quad \text{(Formula 13)}$$

The solutions of the two variables (v and k) are as follows:

$$v = \begin{cases} \nabla k, & \nabla k^2 \geq \dfrac{\psi_2}{\varphi} \\ 0, & \text{otherwise} \end{cases} \quad \text{(Formula 14)}$$

$$k = \mathcal{F}^{-1}\left(\frac{\mathcal{F}(\nabla L) \circ \overline{\mathcal{F}}(\nabla S) + \varphi \mathcal{F}(v) \circ \overline{\mathcal{F}}(\nabla L)}{\mathcal{F}(\nabla S) \circ \overline{\mathcal{F}}(\nabla S) + \varphi \mathcal{F}(\nabla L) \circ \overline{\mathcal{F}}(\nabla L)}\right) \quad \text{(Formula 15)}$$

3) The restoration process of the blurred image specifically includes the following steps:

Restoring the blurred image by using the estimated blurring kernel with the non-blind deconvolution technology:

In the implementation of the present invention, the non-blind deconvolution is realized with a Richardson-Lucy algorithm. See Literature 1 (Perrone, Daniele, and Paolo Favaro. "Total variation blind deconvolution: The devil is in the details." Proceedings of the IEEE Conference on Computer Vision and Pattern Recognition. 2014).

Compared with the prior art, the present invention has beneficial effects:

The present invention proposes a priori constraint and outlier suppression based image deblurring method. The significant structure in the blurred image is obtained by use of L0 norm constraint and heavy-tailed a priori information. Based on the significant structure, the L0 norm constraint is used to evaluate the blurring kernel. The evaluated blurring kernel is subjected to outlier suppression. The final restored image is obtained by using a non-blind deconvolution algorithm. The present invention can solve the problems of the existing algorithms: a priori assumption is incorrect; a priori constraint is inappropriate; and the blurring kernel has outliers and the like. By solving the problems, the present invention can prominently improve the restoration level of the blurred image.

Wherein, $k^n$ indicates a blurring kernel obtained by evaluating an image with minimum size, and $k^0$ indicates evaluated blurring kernel finally obtained.

Figure 3:
Figure 3:
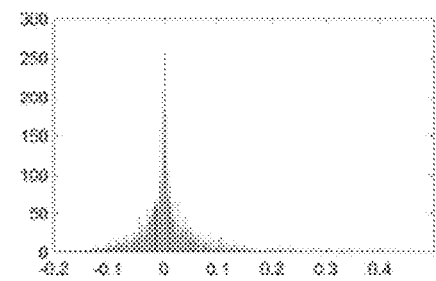
Figure 3:
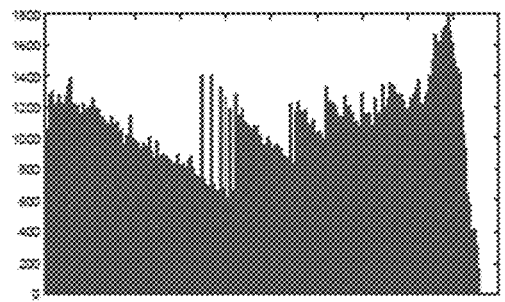
Figure 3:
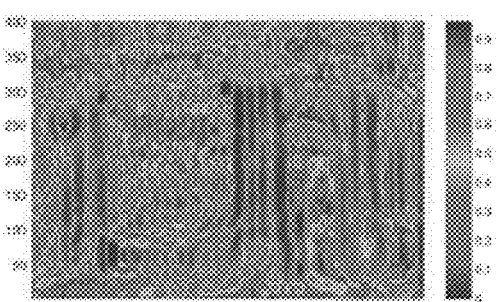

FIG. 3 is a texture diagram of a significant structure of a blurred image in an embodiment of the present invention;

Wherein, (a) indicates an original blurred image; (b) indicates graded distribution of the original blurred image; (c) indicates distribution of a gradient histogram; and (d) indicates an energy diagram of r value expressed by color information, i.e., a value distribution diagram of an original image r(x).

Figure 4:
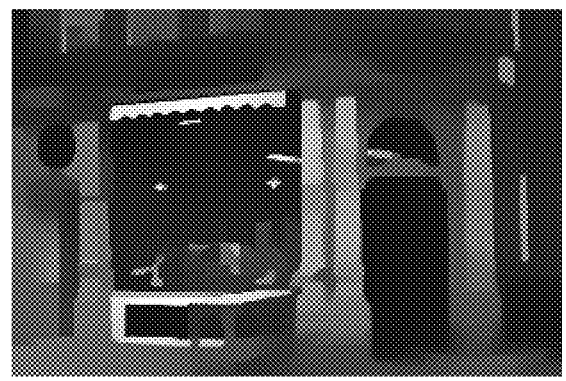

FIG. 4 is an exemplary diagram for the significant structure of the blurred image in the embodiment of the present invention.

Figure 5:
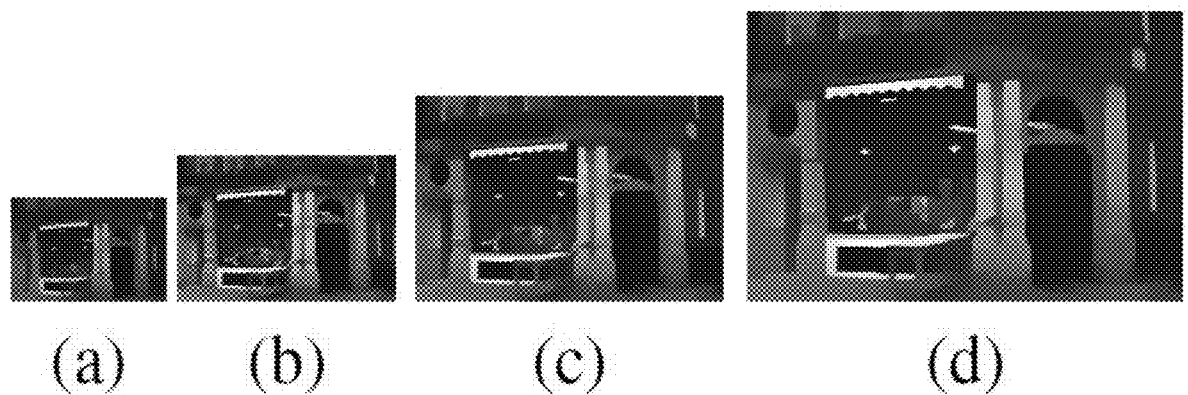

FIG. 5 is significant structures of the blurred images with different sizes in the embodiment of the present invention; Wherein, (a)-(d) indicate the blurred images with different sizes.

Figure 6:
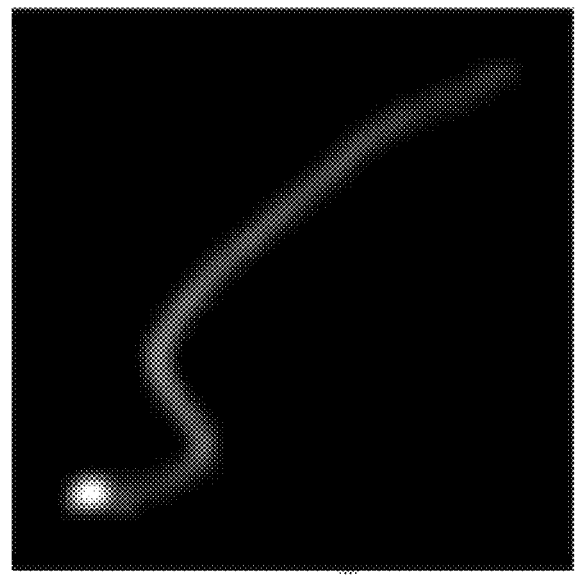

FIG. 6 is a blurring kernel obtained through iterative update of the embodiment of the present invention.

Figure 7:
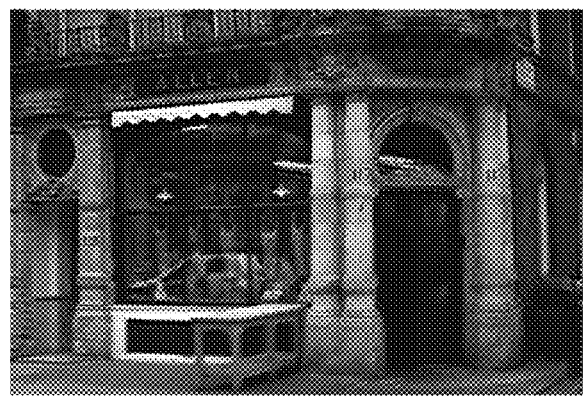

FIG. 7 is an image after restoring the blurred image of the embodiment of the present invention.

Figure 8:

FIG. 8 is a comparison diagram by magnifying the blurred image and restored image thereof in the embodiment of the present invention.

Figure 9:
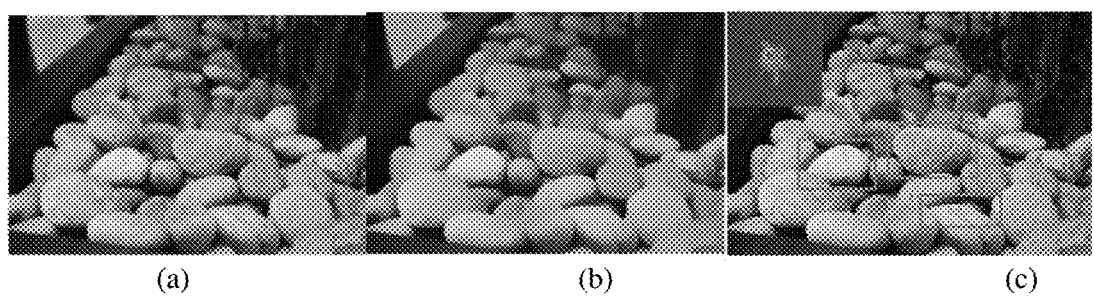

FIG. 9 is comparison of the blurred image, the significant structure and the restored diagram in the embodiment of the present invention;

Wherein, Figure (a) indicates the original blurred image; Figure (b) indicates the significant structure; and Figure (c) indicates the blurred restored image.

DETAILED DESCRIPTION OF THE INVENTION

Further description is made as follows to the present invention through an embodiment in combination with the drawings, but the range of the present invention is not limited in any way.

Figure 1:
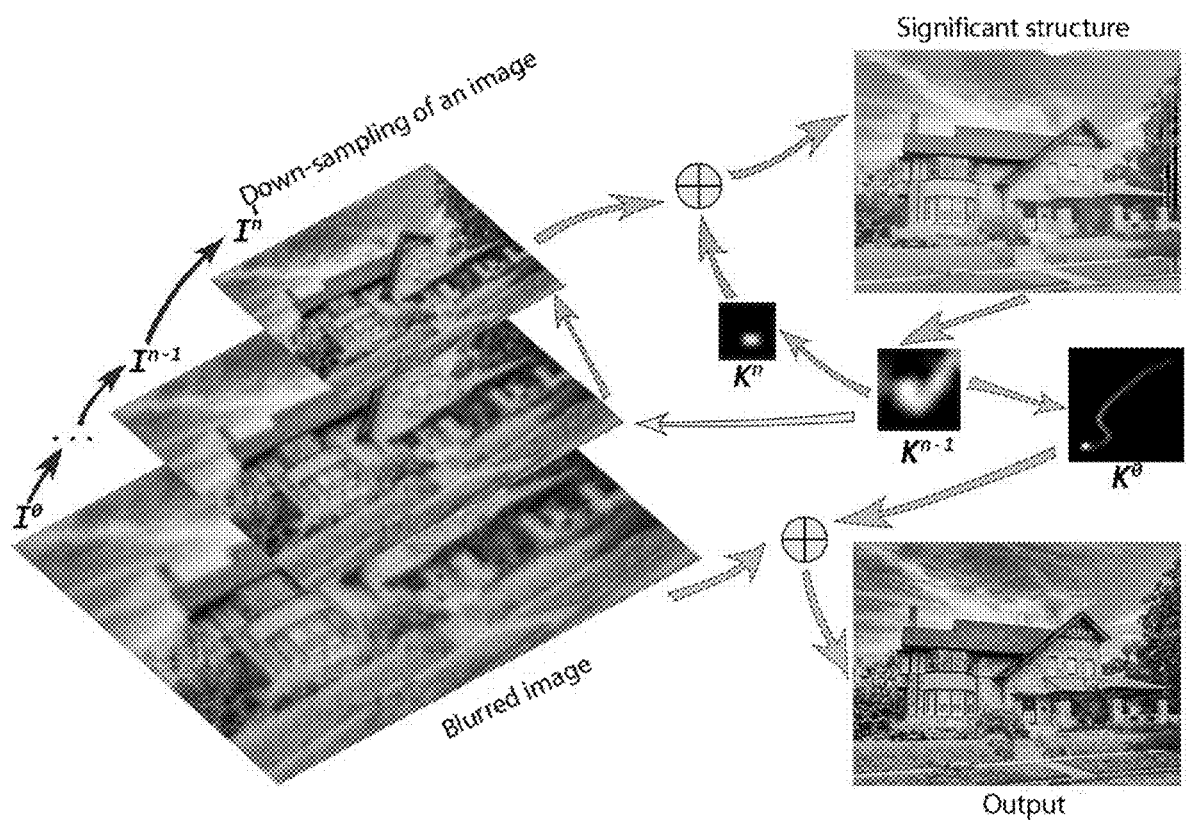
FIG. 1 is a flow diagram of specific implementation of the present invention.
Figure 2:
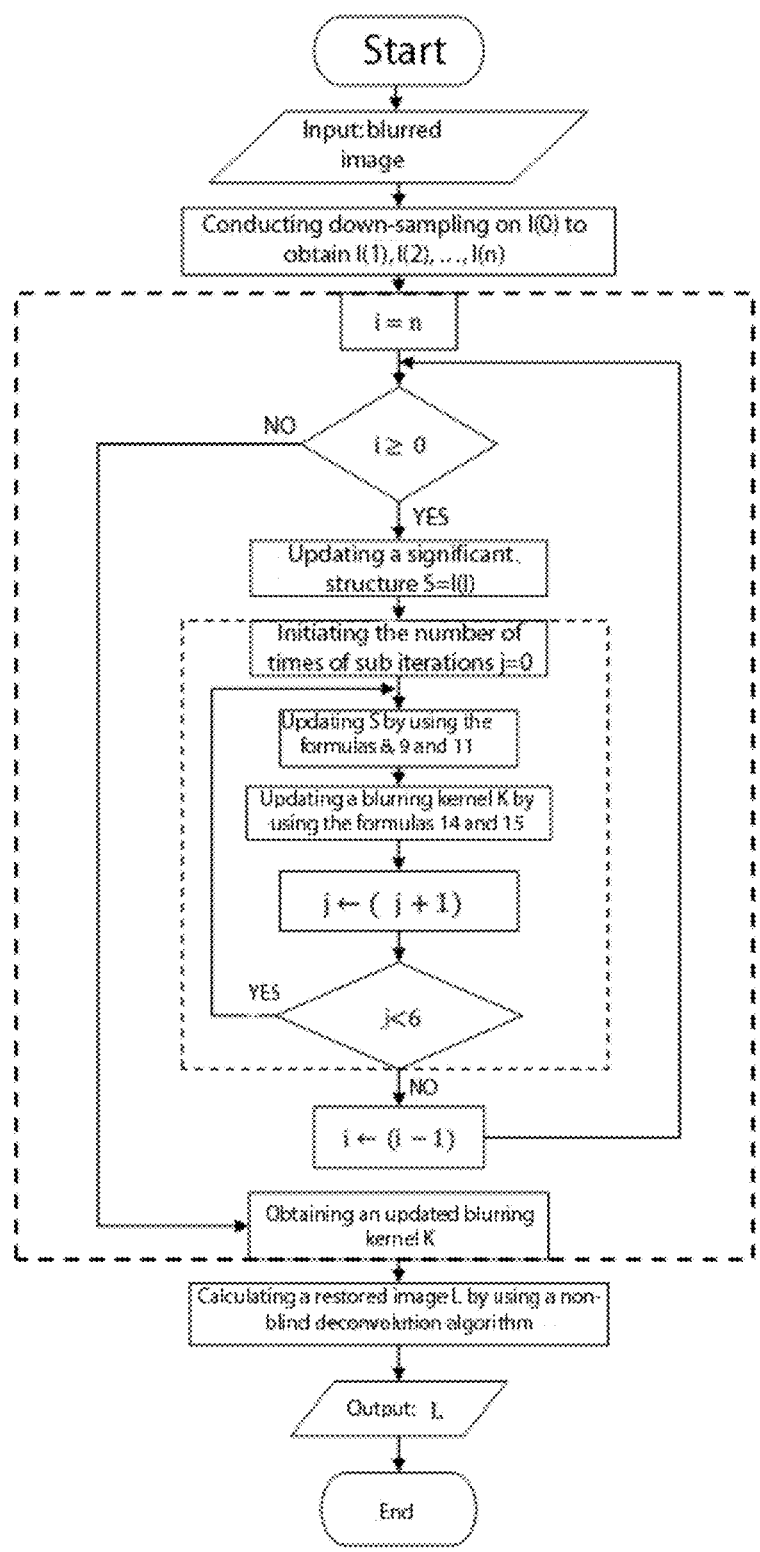
FIG. 2 is a flow block diagram of the method of the present invention.

A priori constraint and outlier suppression based deblurring method proposed by the present invention is shown in FIG. 2. In the Figure, $k^n$ indicates a blurring kernel obtained by evaluating an image with minimum size, and $k^0$ indicates evaluated blurring kernel finally obtained. In the method of the present invention, the blurring kernel is continuously updated with several sampling ways, and the final restored image is obtained by using a non-blind deconvolution algorithm.

The method of the present invention includes the specific steps as follows:

Table 1 is a description for names of parameters adopted in the following steps and corresponding parameter meanings thereof

TABLE 1

| Parameter List | |
|---|---|
| Parameter name | Description |
| λ1 | Coefficient of a substitution variable w in an evaluation process of a significant structure S |
| λ2 | Coefficient of a texture region in the evaluation process of the significant structure S |
| λ3 | Coefficient of a smooth region in the evaluation process of the significant structure S |
| ψ1 | Weight of a blurring kernel k in an evaluation process of the blurring kernel |
| ψ2 | Weight of a substitution variable v in the evaluation process of the blurring kernel |
| γ | Weight of iterative update in the evaluation process of the significant structure S |
| β | Weight of iterative update in the evaluation process of the significant structure S |
| φ | Weight of iterative update in the evaluation process of the blurring kernel |

Step 1. Selection of a blurring model: the present invention adopts a model of Formula 1, and assumes that the noise follows Gaussian distribution, and an optimized equation shown in Formula 2 is obtained;

In the present invention, a convolution model is used for fitting a blurring process of a clear image, as shown in the Formula 1:

$$L = I \otimes k + \eta \quad \text{(Formula 1)}$$

wherein L indicates a blurred image, k indicates a blurring kernel, and i indicates noise (assume the distribution thereof is Gaussian noise);

A priori constraint with a heavy-tailed effect is taken as distribution of a significant structure gradient of the blurred image, as shown in Formula 2:

$$\min_{s}(\|S \otimes k - L\|^2 + \lambda_1 \|\nabla S\|^{0.5}) \quad \text{(Formula 2)}$$

Wherein, S indicates the significant structure of the blurred image;

Step 2: evaluation of the significant structure of the blurred image:

Firstly, obtaining texture calibration of the significant structure with Formula 4 and Formula 5, as shown in FIG. 3(b). FIG. 3 is a texture diagram of a significant structure of a blurred image in an embodiment, wherein, (a) indicates an original blurred image; (b) indicates graded distribution of the original blurred image; (c) indicates distribution of a gradient histogram; and (d) indicates a value distribution of the original image r(x). The texture calibration of the significant structure with the Formula 4 and the Formula 5 is specifically as follows:

We introduce L0 norm to constrain texture of the significant structure S of the blurred image, and meanwhile, limit noise of a smooth region in S with L2 norm. The updated formula is shown in the Formula 3:

$$\min_{s}(\|S \otimes k - L\|^2 + \lambda_1 \|\nabla S\|^{0.5} + \\ \lambda_2 \|\nabla S \circ M\|_0 + \lambda_3 \|\nabla S \circ (1-M)\|_2^2) \quad \text{(Formula 3)}$$

Wherein, M is a binary mask indicating texture region in the significant structure S and (1−M) a binary mask indicating smooth region in S, (1−M) a binary mask indicating smooth region in S. We define M with the Formula 4 and the Formula 5:

$$r(x) = \frac{\left\|\sum_{y \in N_h(x)} \nabla S(y)\right\|}{\sum_{y \in N_h(x)} \|\nabla S(y)\| + 0.5} \quad \text{(Formula 4)}$$

$$M = H(r - \tau_r) \quad \text{(Formula 5)}$$

In the Formula 4, x indicates a location of a pixel point, y represents pixel points within a window $N_h(x)$ of a given size that is centered at pixel point x and r(x) indicates a degree that the pixel point at the location x belongs to the texture part. The texture in S can be preliminarily divided with the Formula 4, the value of r(x) is between 0 and 1, and r(x) is in proportion to the possibility that x belongs to the texture part. Meanwhile, the Formula 4 also limits the appearance of a mutational texture (when the size of the blurring kernel is greater than that of blurred image detail, the image restoration is failed, therefore, the mutational texture should be limited). M in the Formula 5 is obtained by Heaviside step function, wherein $\tau_r$ indicates a threshold of r, which is used for distinguishing a texture region and the smooth region in the significant structure S. In the present invention, we obtain $\tau_r$ with a histogram equalization method.

Secondly, obtaining the significant structure of the blurred image with Formulas 8, 9 and 11, as shown in FIG. 4. FIG. 5 is different structures obtained by estimation at different sizes, specifically as follows:

We introduce two substitution variables u and w to selectively substitute ∇S to obtain the Formula 3, and update S with an iterative method. A variant of the Formula 3 is as follows:

$$\min_{S,u,w}(\|S \otimes k - L\|^2 + \lambda_1 \|w\|^{0.5} + \lambda_2 \|u \circ M\|_0 + \\ \lambda_3 \|u \circ (1-M)\|_2^2 + \beta \|u - \nabla S\|_2^2 + \gamma \|w - \nabla S\|_2^2) \quad \text{(Formula 6)}$$

We obtain the solution of each iteration S, u and w with alternately updated method; Solution of the variable u:

$$\min_{u}(\lambda_2 \|u \circ M\|_0 + \lambda_3 \|u \circ (1-M)\|_2^2 + \beta \|u - \nabla S\|_2^2) \quad \text{(Formula 7)}$$

$$u = \begin{cases} \frac{\beta}{\lambda_3 + \beta} \nabla S, & M = 0 \\ \nabla S, & M \neq 0, \nabla S^2 \geq \frac{\lambda_2}{\beta} \\ 0, & \text{otherwise} \end{cases} \quad \text{(Formula 8)}$$

Solution of the variable w:

$$\min_{w}(\lambda_1 \|w\|^{0.5} + \gamma \|w - \nabla S\|_2^2) \quad \text{(Formula 9)}$$

We solve the Formula 9 with relatively total variation (RTV);

Solution of the variable S:

$$\min_{s}(\|S \otimes k - L\|^2 + \lambda_1 \|w\|^{0.5} + \beta \|u - \nabla S\|_2^2 + \gamma \|w - \nabla S\|_2^2) \quad \text{(Formula 10)}$$

Based on Parseval's theorem, we carry out Fourier transform on Formula 10 to obtain S:

$$S = \mathcal{F}^{-1}\left(\frac{F(L) \circ \overline{\mathcal{F}}(k) + \beta \mathcal{F}(u) \circ \overline{\mathcal{F}}(\nabla L) + \gamma \mathcal{F}(w) \circ \overline{\mathcal{F}}(\nabla L)}{\mathcal{F}(k) \circ \overline{\mathcal{F}}(k) + \beta \mathcal{F}(\nabla L) \circ \overline{\mathcal{F}}(\nabla L) + \gamma \mathcal{F}(\nabla L) \circ \overline{\mathcal{F}}(\nabla L)}\right) \quad \text{(Formula 11)}$$

Wherein F indicates the Fourier transform, and $F^{-1}$ indicates Fourier inversion.

Step 3. blurring kernel estimation, specifically as follows:

In the present invention, the blurring kernel is estimated with gradient information and the significant structure, and the blurring kernel trajectory is obtained through iterative update of Formula 14 and Formula 15, as shown in FIG. 6, diagram on the right of FIG. 8 and FIG. 9(c).

Specifically, the blurring kernel is estimated with the significant structure S of the evaluated blurring image in the present invention. We suppress the outlier in the blurring kernel with L0 norm, and the optimization process is as follows:

$$\min_{k}(\|\nabla S \otimes k - \nabla L\|_2^2 + \psi_1\|k\|_2^2 + \psi_2\|\nabla k\|_0) \quad \text{(Formula 12)}$$

$$\text{s.t. } k \geq 0,$$

$$\|k\|_1 = 1$$

Similarly, we introduce a substitution variable v for iterative update, and the variant of the Formula 12 is as follows:

$$\min_{v,k}(\|\nabla S \otimes k - \nabla L\|_2^2 + \psi_1\|k\|_2^2 + \psi_2\|v\|_0 + \varphi\|v - \nabla k\|_2^2) \quad \text{(Formula 13)}$$

The solutions of the two variables (v and k) are as follows:

$$v = \begin{cases} \nabla k, & \nabla k^2 \geq \dfrac{\psi_2}{\varphi} \\ 0, & \text{otherwise} \end{cases} \quad \text{(Formula 14)}$$

$$k = \mathcal{F}^{-1}\left(\dfrac{\mathcal{F}(\nabla L) \circ \overline{\mathcal{F}}(\nabla S) + \varphi \mathcal{F}(v) \circ \overline{\mathcal{F}}(\nabla L)}{\mathcal{F}(\nabla S) \circ \overline{\mathcal{F}}(\nabla S) + \varphi \mathcal{F}(\nabla L) \circ \overline{\mathcal{F}}(\nabla L)}\right) \quad \text{(Formula 15)}$$

Step 4: non-blind deconvolution, specifically as follows:

Any existing non-blind deconvolution algorithm can be adopted here.

The steps above can be expressed as the following algorithm flow:

---

Algorithm: a priori constraint and outlier suppression based image deblurring method

---

Input: blurred image I
Output: blurred kernel k, and blurred restored image L
Start:
Conducting down-sampling $I^{(0)} \rightarrow I^{(1)}, \ldots, I^{(n)}$ to the blurred image (wherein $I^{(n)}$ has minimum size);
Initializing the blurring kernel corresponding to the blurred image with the minimum size;
Iteration:
Updating the blurred image $I^{(n)} \rightarrow S$;
Iteration:
Estimation of a significant structure:
Using Formula 8 to solve u;
Using Formula 9 to solve w
Using Formula 11 to solve the significant structure S;
Estimation of the blurring kernel:
Using Formula 14 to solve v;
Using Formula 15 to solve k;
Stopping after the iterations reach 6;
n−1→n;
Stopping until n = 0;
Using non-blind deconvolution algorithm to obtain a restored image L.

---

In the implementation of the present invention, non-blind deconvolution is carried out by using algorithm proposed in Literature 1 (Perrone, Daniele, and Paolo Favaro. "Total variation blind deconvolution: The devil is in the details." *Proceedings of the IEEE Conference on Computer Vision and Pattern Recognition*. 2014). FIG. 7 is the restored image of the blurred image. Taking FIG. 8 for example additionally, the left figure is the blurred image and a magnifying region thereof, and the right figure is a restoration effect and corresponding magnifying region. Wherein the blurring kernel is expressed at the upper left corner of the right figure in a form of the energy diagram.

It should be noted that, the publicity of the embodiment aims at helping further understand the present invention, but those skilled in the art can understand that: all kinds of replacements and modifications may be possible without departing from the spirit and range of the present invention and claims attached. Therefore, the present invention should not be limited to the content disclosed by the embodiment, and the range protected as required by the present invention is subject to the range defined by the claims.

The invention claimed is:

1. A priori constraint and outlier suppression based image deblurring method, comprising:
obtaining a significant structure S of a blurred image L by solving the following formula using an iterative process:
wherein k is a blur kernel; $\lambda_1$, $\lambda_2$, $\lambda_3$, $\beta$ and $\gamma$ are constants; M is a binary mask indicating a texture region in the significant structure S and (1−M) a binary mask indicating a smooth region in the significant structure S; and u and w are two auxiliary variables; and wherein at each iteration the values of u and w are updated in sequence, an updated S is subsequently obtained using the updated u and v and a process involving Fourier transform;
estimating the blurring kernel k by an iterative process, wherein at each iteration k is updated using gradient information and the obtained significant structure S; and
restoring the blurred image by using the estimated blurring kernel with a non-blind deconvolution technology.

2. The image deblurring method of claim 1, wherein the binary mask M is defined with the following formulas:

$$r(x) = \dfrac{\left\|\sum_{y \in N_h(x)} \nabla S(y)\right\|}{\sum_{y \in N_h(x)} \|\nabla S(y)\| + 0.5}$$

$$M(x) = H(r(x) - \tau_r)$$

wherein, x indicates a location of a pixel point, y represents pixel points within a window $N_h(x)$ of a given size that is centered at pixel point x, and r(x) indicates a degree that the pixel point at the location x belongs to the texture part; the value of r(x) is between 0 and 1, and r(x) is in proportion to the possibility that x belongs to the texture part; M is obtained by Heaviside step function, wherein $\tau_r$ indicates a threshold of r for distinguishing a texture region and the smooth region in the significant structure S.

3. The image deblurring method of claim 2, wherein $\tau_r$ is obtained with a histogram equalization method.

4. The image deblurring method of claim 1, wherein a blurring process to produce the blurred image L from a clear image I is:

$$L = I \otimes k + \eta$$

wherein $\eta$ indicates noise.

5. The image deblurring method of claim 4, wherein the distribution of the noise $\eta$ is Gaussian distribution.

* * * * *